(12) United States Patent
Patwardhan et al.

(10) Patent No.: US 9,356,966 B2
(45) Date of Patent: May 31, 2016

(54) SYSTEM AND METHOD TO PROVIDE MANAGEMENT OF TEST DATA AT VARIOUS LIFECYCLE STAGES

(71) Applicant: Tata Consultancy Services Limited, Maharashtra (IN)

(72) Inventors: Nakhil Girish Patwardhan, Maharashtra (IN); Ashim Roy, Maharashtra (IN); Rupali Kedar Kulkarni, Maharashtra (IN); Sumit Johri, Maharashtra (IN); Amol Rajendra Limaye, Maharashtra (IN); Sachin P Lodha, Maharashtra (IN); Vijayanand Mahadeo Banahatti, Maharashtra (IN); Iyengar Venkatachary Srinivasan, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 345 days.

(21) Appl. No.: 14/183,980

(22) Filed: Feb. 19, 2014

(65) Prior Publication Data
US 2014/0282848 A1   Sep. 18, 2014

(30) Foreign Application Priority Data

Mar. 14, 2013   (IN) ............................ 778/MUM/2013

(51) Int. Cl.
G06F 9/44   (2006.01)
H04L 29/06  (2006.01)
G06F 11/36  (2006.01)

(52) U.S. Cl.
CPC ............ H04L 63/20 (2013.01); G06F 11/3684 (2013.01)

(58) Field of Classification Search
CPC ........................................................ G06F 9/44
USPC .................................. 717/124–126, 131–132
See application file for complete search history.

(56) References Cited

U.S. PATENT DOCUMENTS

7,113,883 B1   9/2006 House et al.
7,702,613 B1 * 4/2010 Dankenbring ...... G06F 11/3684
                                                      707/687

(Continued)

FOREIGN PATENT DOCUMENTS

EP            1576500 A2    9/2005

OTHER PUBLICATIONS

K. Krishna Murthy and Janardhana S Channagiri, "Test Data Management—enabling reliable testing through realistic test data", Oct. 2009.

*Primary Examiner* — Chat Do
*Assistant Examiner* — Jae Jeon
(74) *Attorney, Agent, or Firm* — Hayes Soloway PC (57) ABSTRACT

Disclosed is a method and system to provide management of test data, the management performed during at least one stage associated with lifecycle of the test data. The system comprises a processing engine, a categorization module, a privacy regulation module, a meta-data analyzer, and an output generation module. The processing engine configured to generate the test data in response to a test data request. The processing engine further comprises of the categorization module configured to categorize the test data request. The processing engine further comprises of the privacy regulation module configured to model at least one privacy regulation in accordance with a geographical location and an enterprise domain. The processing engine further comprises the meta-data analyzer configured to analyze an imported meta-data. The system further comprises of the output generation module configured to provide the test data so requested.

15 Claims, 6 Drawing Sheets

(56) References Cited

U.S. PATENT DOCUMENTS

| | | |
|---|---|---|
| 8,548,950 B2 | 10/2013 | Moore et al. |
| 8,984,341 B1 * | 3/2015 | Chandrasekhar-apuram ............... G06F 11/263 714/32 |
| 2005/0229159 A1 | 10/2005 | Haba et al. |
| 2008/0071727 A1 * | 3/2008 | Nair ................. G06F 17/30115 |
| 2010/0257140 A1 | 10/2010 | Davis et al. |
| 2011/0137872 A1 | 6/2011 | Coldicott et al. |
| 2014/0101129 A1 * | 4/2014 | Branish, II ........ G06F 17/30893 707/714 |

* cited by examiner

SYSTEM AND METHOD TO PROVIDE MANAGEMENT OF TEST DATA AT VARIOUS LIFECYCLE STAGES

TECHNICAL FIELD

The present subject matter described herein, in general, relates to management of test data, and more particularly to management of test data at one or more stages associated with lifecycle of the test data.

BACKGROUND

The increasing need of quality check of software applications has made the implementation of testing strategies vital. To ensure effective implementation of the testing strategies, it is of utmost importance to manage test data effectively.

There exists a plurality of problems with respect to management of the test data. With the growth in the number of software implementations in an enterprise, the amount of data required for the testing of the software implementations has increased enormously. Effective storage of the enormous test data is a major problem faced by the enterprises today. Further, the existing solutions do not provide for an effective means of archival of the test data. In the current scenario, redundant copies of the test data are created which adds to the already existing test data.

Further, the test data goes through various stages during testing phase of the software application. The life-cycle of the test data includes stages of creation, subsetting, masking, storage, archival, usage, monitoring and disposal. There exist various tools managing the test data at individual stages of the entire life-cycle of the test data. However, none of the existing tools provide a tool for the management of the test data throughout the life-cycle of the test data.

In addition, the existing solutions fail to reduce ad-hoc creation of the test data which ultimately increases the cycle time of the test data. Also, testers while testing the software application tend to use the test data already in use by another tester causing the data over-stepping. None of the existing tools provide for a solution to this problem of data over stepping.

Further, breach of data privacy is an increasing cause of concern when the test data is created by copying the data from the production environment. The privacy regulations with respect to the data differ according to domain and geographical location which makes it difficult to find sensitive data fields and protect the sensitive data.

SUMMARY

This summary is provided to introduce aspects related to systems and methods to provide management of test data and the aspects are further described below in the detailed description. This summary is not intended to identify essential features of the claimed subject matter nor is it intended for use in determining or limiting the scope of the claimed subject matter.

In one implementation, a system provides management of test data, the management performed during at least one stage associated with lifecycle of the test data. The system comprises of a processor and a memory coupled to the processor, wherein the processor is capable of executing a plurality of modules stored in the memory. The plurality of modules comprise a processing engine configured to generate the test data in response to the test data request, wherein the processing engine retrieves the test data by considering at least one parameter affecting a retrieval of the test data. The processing engine further comprises a categorization module configured to categorize the test data request while supplying the test data wherein a categorization of the test data is dependent on a type of usage of the test data. The processing engine further comprises a privacy regulation module configured to model at least one privacy regulation in accordance with a geographical location and an enterprise domain selected by a user. The privacy regulation module further comprises a meta-data analyzer configured to analyze an imported meta-data to identify at least one sensitive data field therein. The privacy regulation module further comprises an output generation module configured to provide the test data requested, wherein the test data is reserved for a pre-determined duration by the user by using the data reservation module, therein the output generation module archives the test data using a data archival module, wherein the test data is available for reuse in response to the user request.

The present disclosure can also be viewed as providing a method to provide management of test data, the management performed during at least one stage associated with lifecycle of the test data. In this regard, one embodiment of such a method, among others, can be broadly summarized by the following steps: raising at least one test data request to retrieve the test data required by a tester for testing a new application; processing said at least one test data request to generate the test data as required, wherein the test data is retrieved based on at least one parameter affecting the retrieval, the processing further comprising steps of: categorizing the at least one test data request while supplying the test data, wherein a categorization of the test data request is dependent on a type of usage of the test data; modeling at least one privacy regulation in accordance with a geographical location and an enterprise domain selected by a user, wherein an imported meta-data is analyzed to identify at least one sensitive data field therein; and generating as an output the test data requested, wherein the test data is reserved for a pre-determined duration by the user, wherein the output generated is archived, and wherein the test data is available for reuse in response to a user request, wherein the steps of raising the at least one test data request, processing said test data request, categorizing the test data request, modeling the at least one privacy regulation, and generating as an output the test data requested are performed by a processor.

A computer program product having embodied thereon a computer program to provide management of test data, the management of the test data performed during at least one stage associated with lifecycle of the test data. The computer program product comprises: a program code for raising at least one test data request to retrieve the test data required by a tester for testing a new application; a program code for processing said at least one test data request to generate the test data as required, wherein the test data is retrieved based on at least one parameter affecting the retrieval, the processing further comprising steps of: a program code for categorizing the at least one test data request while supplying the test data, wherein a categorization of the test data request is dependent on a type of usage of the test data; a program code for modeling at least one privacy regulation in accordance with a geographical location and an enterprise domain selected by a user, wherein an imported meta-data is analyzed to identify at least one sensitive data field therein; and a program code for generating as an output the test data requested, wherein the test data is reserved for a pre-determined duration by the user, wherein the output generated is archived, and wherein the test data is reused with respect to the user's request.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods to provide management of test data are described. The system performs management of the test data at various stages associated with life-cycle of the test data. Firstly, a user raises a test data request in order to retrieve the test data required for testing of a software application. The test data request raised by the user is categorized by the system according to the end usage of the test data to reduce the time spent in generation of the test data. Further, the test data is generated in order to service the test data request raised by the user.

The system further models privacy regulations with respect to an enterprise domain and a geographical location. In order to generate the test data, data is imported from various test data sources in a meta-data format. The system subsequently analyzes the meta-data imported to identify sensitive fields. The sensitive fields in the meta-data imported are identified with respect to the privacy regulations modeled by the system.

Subsequent to the generation of the test data so requested by the user, the system provides the test data to the user. The system also makes a provision for archival of the test data in order to reuse the test data already used by the user. Also, the test data already in use is reserved by the system for pre-determined time duration with the purpose of restricting the access of the test data so reserved to another user.

While aspects of described system and method to provide management of test data may be implemented in any number of different computing systems, environments, and/or configurations, the embodiments are described in the context of the following exemplary system.

Figure 1:
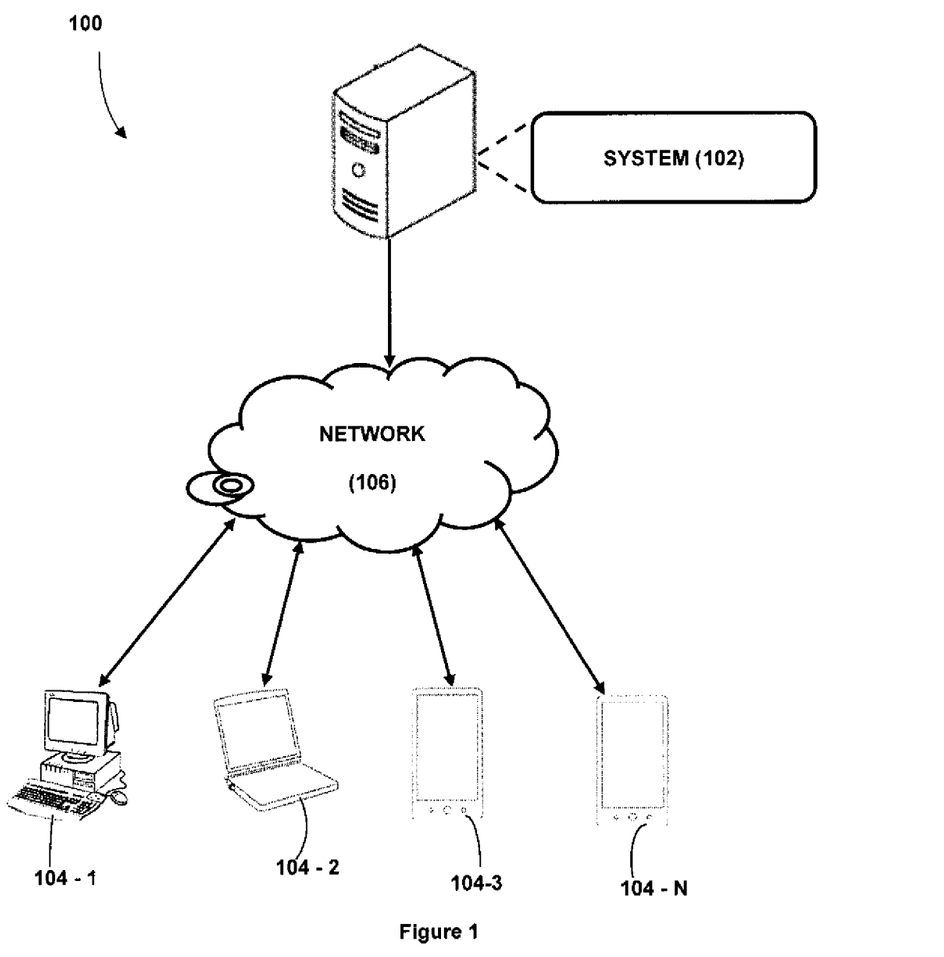
FIG. 1 illustrates a network implementation of a system to provide management of test data, the management performed at one or more stages associated with lifecycle of the test data is shown, in accordance with an embodiment of the present subject matter.

Referring to FIG. 1, a network implementation 100 of system 102 to provide management of test data at one or more stages associated with life-cycle of the test data is illustrated, in accordance with an embodiment of the present subject matter. In one embodiment, the system 102 provides for generation of one or more test data requests. The test data requests are catered to by creation of the test data depending upon various pre-defined parameters. The test data request is further categorized depending upon end usage of the test data. The test data requested by a user is imported from various test data sources in a meta-data format. The meta-data so imported is further analyzed to identify the sensitive data fields therein. Also, the test data so generated may be reserved upon a request of the user for pre-determined time duration. In addition, the test data is archived in order to reuse the test data generated by the system.

Although the present subject matter is explained considering that the system 102 is implemented as a tool on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
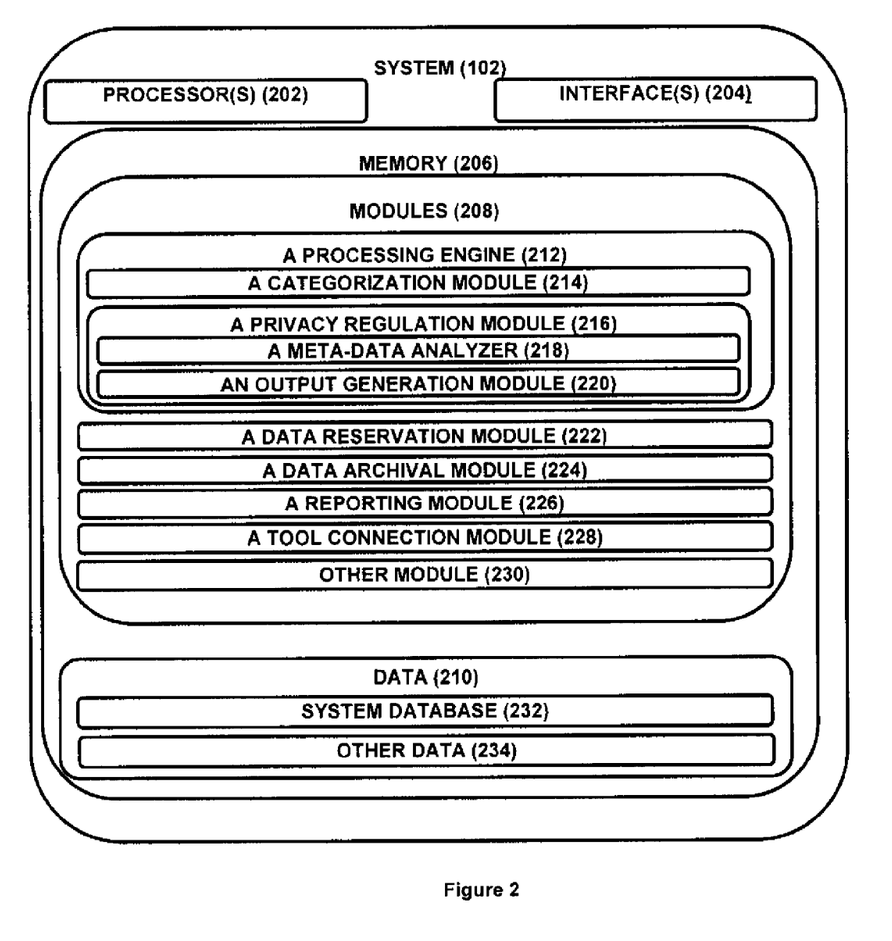
FIG. 2 illustrates the system, in accordance with another embodiment of the present subject matter.

Referring now to FIG. 2, the system 102 is illustrated in accordance with an embodiment of the present subject matter. In one embodiment, the media system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a processing engine 212, a categorization module 214, a privacy regulation module 216, a meta-data analyzer 218, an output generation module 220, a data reservation module 222, a data archival module 224, a reporting module 226, a tool connection module 228 and other modules 230. The other modules 230 may include programs or coded instructions that supplement applications and functions of the system 102.

The data 210, amongst other things, serves as a repository for storing data processed, received, and generated by one or more of the modules 208. The data 210 may also include a system database 232, and other data 234. The other data 234 may include data generated as a result of the execution of one or more modules in the other module 230.

In one implementation, at first, a user may use the client device 104 to access the system 102 via the user interface 204. The user may register them using the I/O interface 204 in order to use the system 102. The user may raise a test data request through the user interface 204 in order to retrieve test data, the test data is further used for testing a new application. The working of the system 102 may be explained in detail in FIGS. 3, 4 and 5 explained below. The system 102 may be used for managing the test data at one or more stages associated with life-cycle of the test data. The one or more stages associated with lifecycle of the test data further comprises of creation, sub-setting, masking, storage, data archival, and a combination thereof.

The processing engine 212 may generate the test data in response to or with respect to the test data request raised by the user. The processing engine 212 is configured to check the test data against one more parameters affecting the retrieval of the test data. The parameters affecting the retrieval of the test data includes a lifecycle time of the test data, storage space requirement and privacy breach. The processing engine 212 may further comprise the categorization module 214 configured to categorize the test data request depending upon the end usage of the test data. The test data request is categorized in order to reduce the time spent while supplying the test data with respect to the test data request and thereby reduce the ad-hoc nature of the test data requests.

In one implementation, the categorization of the test data request may include but is not limited to Quality Analysis (QA) Refresh, QA Slice, Production Slice, Synthetic Data, Volume Data and Data from Archive. Firstly, QA Refresh is a periodic request which may be raised quarterly or half-yearly. In QA Refresh data available in production environment is replicated in QA environment. Thus, when QA Refresh request is raised by the user, the test data is generated by the processing engine 212 by replicating the data available in the production environment.

Secondly, QA Slice is the test data request, wherein the data available in the QA environment is replicated and made available to the user. By way of a specific example, the user raising the test data request may take additional inputs from a Subject Matter Expert (SME) of the application. The additional inputs may be the data in the form of tables available in the QA environment. Thirdly, Production Slice is the test data request. The test data is requested by the user from the production environment. By way of another example, Production Slice is the test data request raised by the user when a bug is reported in the production environment.

Fourthly, Synthetic Data is the test data request raised by the user where a new application has to be tested. In order to service the Synthetic Data request, the test data is newly created as no data is present to service the test data request. Also, Volume Data request is raised when a large volume of data is required by the user in order to perform load testing or performance testing. Lastly, the Data from Archive is the test data request raised by the user when the test data is obtained from the test data already archived. In one implementation of the categorization module 214, the data may be directly downloaded from data archive or the test data request may be served through another user.

In one implementation of the system 102, the processing engine 212 further comprises of the tool connection module 228 configured to enable connection and use of external tools. The tool connection module 228 may perform two steps of input page creation and implementation of a java function to execute the system 102. The input page created by the tool connection module 228 enables the system 102 to capture inputs by given by the user. By way of another example, let a file required to create the input page be inputs.jsp. The inputs.jsp file contains all fields that are required by the system 102 for execution.

The tool connection module 228 enables external tools to be plugged in to the system 102 to further perform one or more operations at one or more stages associated with the lifecycle of the test data to further generate the test data so requested. The one or more operations may include but are not limited to masking, sub-setting, synthetic data generation, and data explosion and data scrubbing.

Figure 3:
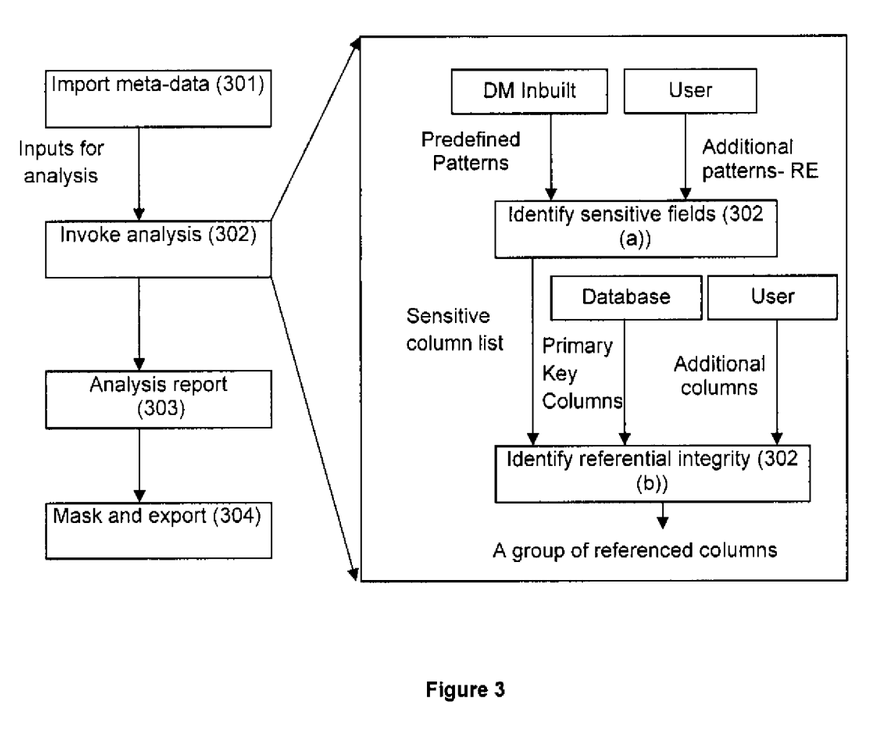
FIG. 3 illustrates a method for analysis of imported meta-data, in accordance with another embodiment of the present subject matter.
Figure 4:
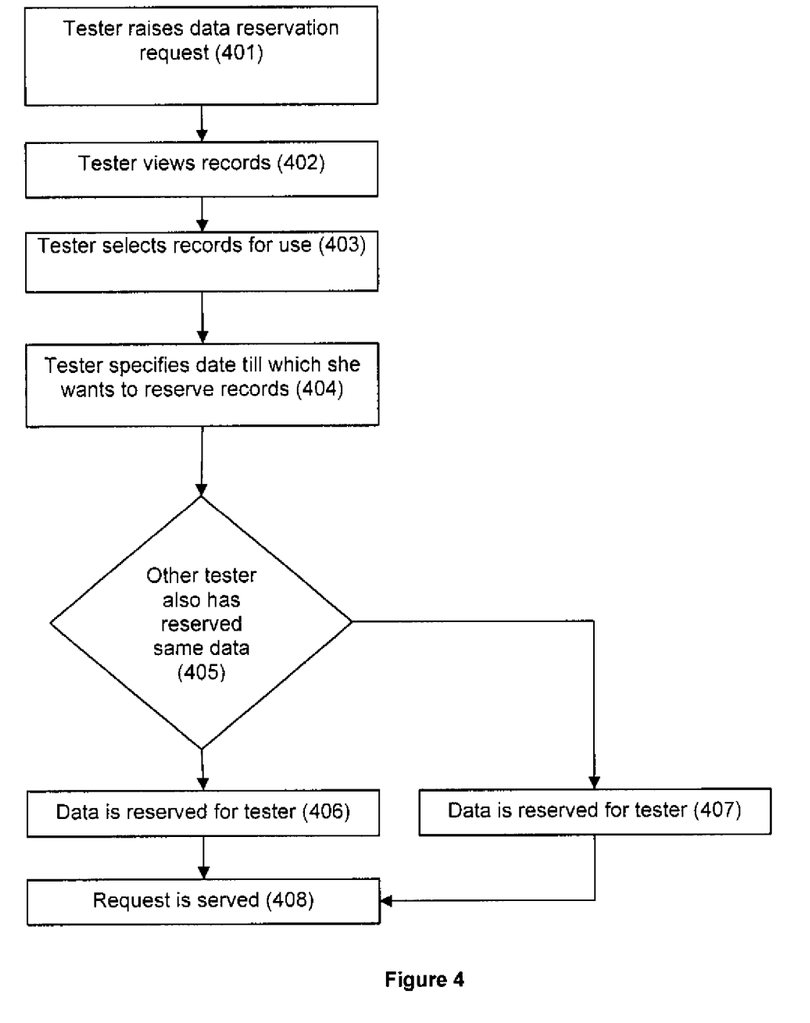
FIG. 4 illustrates a method for reservation of the test data, in accordance with another embodiment of the present subject matter.

In one implementation of the system 102, referring to FIG. 2, the processing engine 212 further comprises of the privacy regulation module 216, the privacy regulation 216 is configured to model one or more privacy regulations in accordance with a geographical location and an enterprise domain. The geographical location and the enterprise domain are selected by the user to regulate the use of the test data in the test environment. The privacy regulation module 216 further comprises of the meta-data analyzer 218, wherein the meta-data analyzer 218 is configured to analyze an imported meta-data to identify one or more sensitive data fields therein. FIG. 3 describes the analysis performed by the meta-data analyzer 218. In the first step, in order to generate the test data, the meta-data needs to be imported from various meta-data sources (as shown in step 301). The imported meta-data is further analyzed to identify sensitive data fields in accordance with the privacy regulations modeled by the privacy regulation module 216 (as shown in step 302).

The analysis of the meta-data is performed based on names of columns in tables of a database in which the meta-data is stored. The analysis of the meta-data results in the identification of sensitive data fields and referential integrity between data-fields. In order to identify the sensitive data fields, the names of columns in the tables of the database are matched with pre-defined set of patterns, wherein the pre-defined set of patterns may be email, or user defined patterns and the user defined pattern may be the name of a customer. In case a match is found, the column is tagged as the sensitive data field. In order to identify the sensitive data fields, the pre-defined set of patterns and the user defined patterns are given as an input and an output is columns identified as sensitive (as shown in step 302(a)).

Further, on identifying the sensitive data fields, referential integrity between the columns is identified (as shown in step 302(b)). A reference between two or more columns of the sensitive data fields is established depending upon a pre-defined condition, the pre-defined condition further includes a condition wherein the columns of two or more tables in the database occur with a similar name and foreign key constraints present in a database. By way of a specific example, consider two tables named 'ADDRESS_TAB' containing columns CITY, STATE and a table named 'INDIVIDUAL' containing columns ID, CITY and LAST_NAME. A reference may be established between the columns CITY of 'ADDRESS TAB' and CITY of 'INDIVIDUAL' as the columns have similar names. The input in this case may be a set of names of columns identified as sensitive, primary key columns of the database and additional columns specified by the user. The output is a set of groups of columns having reference between them. Elements of each group of columns are related to each other. An element is the name of column, wherein the name of column is 'name of the column, augmented by the name of the table and name of the database'.

By way of another example, considering a scenario in which input to the meta-data analyzer 218 is a set of pre-defined patterns and output is a list of columns wherein the name of the column matches the pattern. Considering a table named ADDRESS_TAB containing columns CITY, STATE. Also, considering another table named INDIVIDUAL containing columns ID, CITY and LAST_NAME. In this particular scenario the pre-defined patterns are CITY and LAST_NAME. The output contains column named CITY from the table ADDRESS_TAB, the table named INDIVIDUAL and column named LAST_NAME from the table named INDIVIDUAL.

Further, as shown in the step 303, a report may be generated by the reporting module 226 for the purpose of depicting results of the analysis performed by the meta-data analyzer 218. The report is further employed for masking of the sensitive data fields. The report may provide set of potential columns which are sensitive and the set of group of columns wherein the elements in each group are possibly related to each other. As shown in step 304, the sensitive data fields are masked and exported further for the purpose of test data management.

In one implementation of the system 102, the system 102 further comprises of the output generation module 220 which is configured to provide the test data requested, such that the test data may be reserved for a pre-determined duration by the user by way of the data reservation module 222. The test data is reserved by the user in order to avoid data over-stepping or data stamping by another user. The operation of the data reservation module 222 may be explained by referring to FIG. 4. By way of another example, considering a scenario in which the user is a tester performing test on the application. In the first step 401, the tester raises a request to reserve the test data. In the next step 402, the tester views the records which can be reserved by the tester. Further, in step 403, the tester selects the records to be reserved. In the next step 404, the tester specifies the pre-determined duration by specifying a time, wherein the difference between current time and the time selected specifies the duration for which the test data would be reserved. In the next step 405, the data reservation module 222 checks if the test data specified by the tester to be reserved is already under reservation by another tester. In case the test data is reserved, the tester would not be allowed to reserve the test data specified (step 407) and only the test data which is available would be allowed to be reserved (step 406). In the last step (step 408), the request for the test data reservation is served by the data reservation module 222.

The output generation module 220 further comprises of the data archival module 224 which is configured to archive the test data, the test data may be further reused in response to or with respect to the user's request. The test data may be archived for the test data provided through the test data requests of type QA Slice, Production Slice and Synthetic Data Generation. The test data archived by the data archival module 224 can be further downloaded by the user. The data archival module 224 also makes a provision for purging the entire archived test data or purging of specific records of the archived test data. The archival of the test data may take place only when a request for the archival of the test data has been raised by the user. On servicing of the test data request, the test data is generated in the form of flat files.

Figure 5:
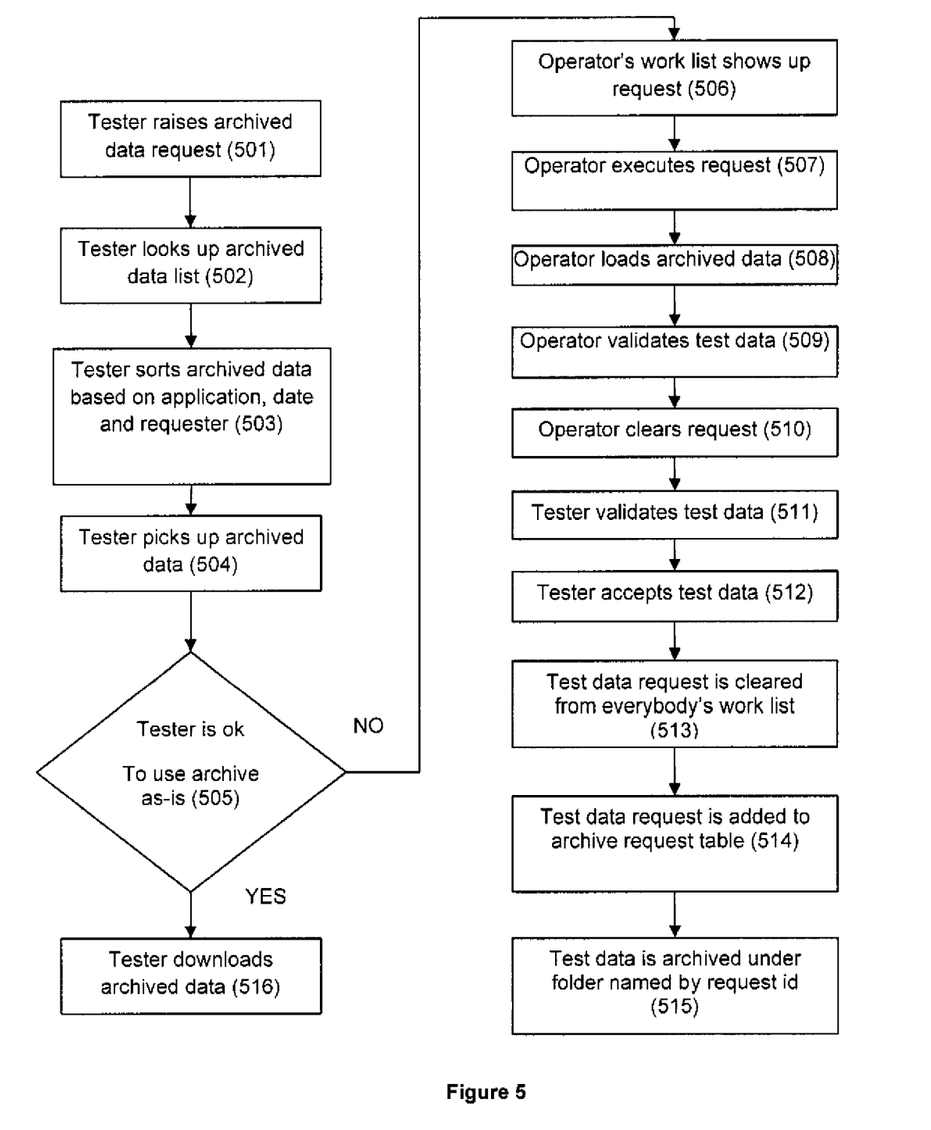
FIG. 5 illustrates a method for archival of the test data, in accordance with another embodiment of the present subject matter.

The archival of the test data may be described by referring to FIG. 5. By way of another example, the user may be a tester or an operator servicing the test data archival request. In the first step 501, the tester raises an archived test data request. In the next step 502, the tester looks up the archived data list. Further, in the step 503, the tester sorts the archived data based upon the application under test, date and requestor. The test data is archived for a specific application. While storing the test data in an archive, date on which the archive was created and the user who made request to create the archive is also stored. While getting the test data from the archive, users can sort archives in the repository based on either application or creation date or requestor. In the next step 504, the tester picks up the archived data. Further, in step 505, the data archival module 224 checks if the tester is satisfactory with using the archive in its current form. In case the tester accepts to use the archive then the archived data is downloaded with respect to the request of the tester (step 516).

In case the tester does not accept the usage of the archive in its current form then the requested is directed to the operator. In the next step, 506, the operator's work list shows up the test data archival request. Further, the operator executes the request (step 507) by loading the archived data (step 508). In the next step, 509, the operator validates the test data to be loaded and further clears the request (step 510). In step 511, the tester validates the test data to be loaded and on validation, the test data is accepted by the tester (step 512). On the acceptance of the test data by the tester, the test data request is cleared from the work list of the tester and the operator (step 513). In the next step, 514, the test data request is added to archive request table. In the last step, 515, the test data is archived under a folder named by the request id generated specifically for the request raised by the tester.

In one implementation of the data archival module 224, the test data to be archived is stored in an archive directory. The archive directory may be created within the HOME directory of the system 102. The archive directory comprises of multiple repositories. Each of the repositories stores multiple records. On the saturation of each of the repository, another repository is created automatically. The structure of the archive directory is multi-layered in order to access the test data archived faster. For each record getting added in the archive, one directory is created. The directory name is same as relative number of the records getting archived, i.e. the number of records archived in the repository. The size of the repository may be configured by the user.

The archive directory contains a meta information file with the extension, .archiveinformation. The .archiveinformation is a properties file which contains the number of repositories currently present in the archive directory. Each repository contains a meta information file with the extension .repositoryinfo. The .repositoryinfo is a properties file which contains the number of records currently present in each repository. Each record contains a zip file which is a compressed form of the test data being archived and named as <RepositoryName>_<RecordNumber>.zip, and two meta information files, .entries, .recordinformation. The .entries file contains list of all file names present actually in the zip file and the .recordinformation file contains additional properties of the record.

Advantages

The system 102 provides test data management for the test data in an integrated form at all the stages associated with the life-cycle of the test data.

Further, the system 102 provides for reduction in the time spent in supplying the test data to the user through the test data request categorization performed by the categorization module 214. The categorization of the test data request also reduces the ad hoc nature of the test environment.

Also, the archival of the test data provides for reuse of the test data by the user Further, the reservation of the test data prevents data overstepping or data stamping when the test data is already in use by a user.

Figure 6:
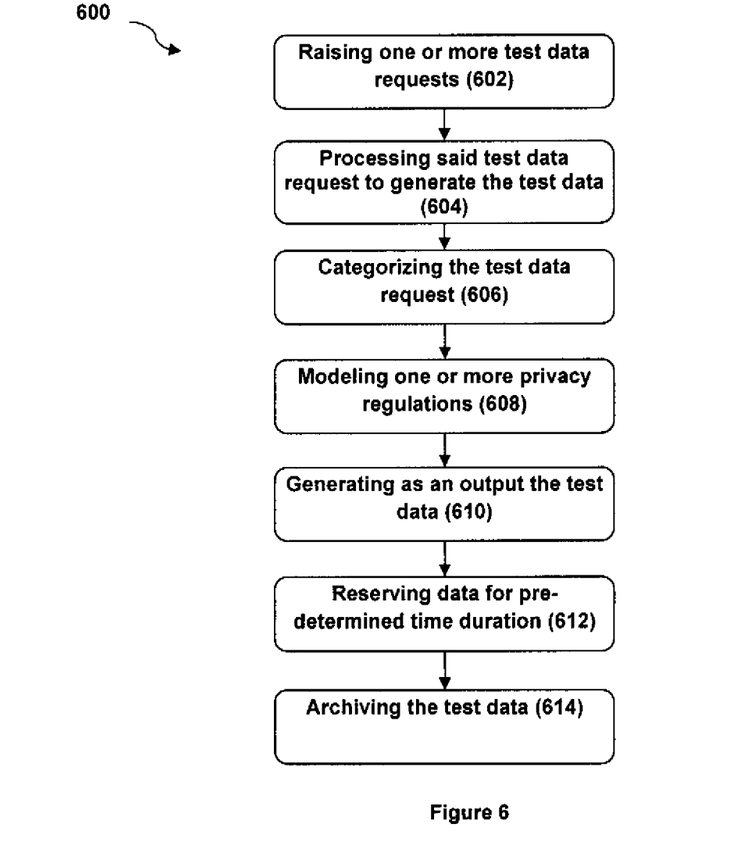
FIG. 6 illustrates a method to provide management of test data, the management performed at one or more stages associated with lifecycle of the test data, in accordance with another embodiment of the present subject matter.

Referring now to FIG. 6, a method 600 for management of test data at one or more stages associated with life-cycle of the test data is shown, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described system 102.

At block 602, one or more test data requests may be raised to retrieve the test data required by a tester for testing a new application. In one implementation, the test data request may be raised through the user interface 204.

At block 604, the test data is processed in order to generate the test data, wherein the test data is retrieved considering one or more parameters affecting the retrieval. In one implementation, the test data may be retrieved by the processing engine 212.

At block 606, the test data request is categorized in order to reduce time spent while supplying test data in accordance with the test data request, wherein the categorization further depends on a type of usage of the test data. In one implementation, the categorization of the test data request may be performed by the categorization module 214.

At block 608, one or more privacy regulations are modeled in accordance with a geographical location and an enterprise domain so selected by a user. In one implementation, the privacy regulations may be modeled by the privacy regulation module 216.

At block 610, an output test data is generated with respect to the test data request raised by the user. In one implementation, the output may be generated by the output generation module 220.

At block 612, the output generated by the output generation module 220 may be reserved by the user for pre-determined time duration. In one implementation, the reservation of the output may be performed by the data reservation module 222.

At block 614, the output generated may be further archived. In one implementation, the archival of the output generated may be performed by the data archival module 224.

Although implementations for methods and systems management of the test data at one or more stages associated with the life-cycle of the test data have been described in language specific to structural features and/or methods, it is to be understood that the appended claims are not necessarily limited to the specific features or methods described. Rather, the specific features and methods are disclosed as examples of implementations for management of the test data.

We claim:

1. A system to provide management of test data, the management performed during at least one stage associated with a lifecycle of said test data, the system comprising:
a processor; and
a memory coupled to the processor, wherein the processor is capable of executing a plurality of modules stored in the memory, and wherein the plurality of modules comprise:
a processing engine configured to generate said test data in response to a test data request, wherein the processing engine retrieves the test data by considering at least one parameter affecting a retrieval of the test data, the processing engine further comprising:
a categorization module configured to categorize the test data request while supplying the test data, wherein a categorization of the test data request is dependent on a type of usage of the test data; and
a privacy regulation module configured to model at least one privacy regulation in accordance with a geographical location and an enterprise domain selected by a user, the privacy regulation module further comprising:
a meta data analyzer configured to:
analyze an imported meta-data to identify at least one sensitive data field therein wherein analysis of the imported meta-data is performed by matching names of columns with pre-defined set of patterns and user defined patterns; and
establish a referential integrity depending upon a pre-defined condition between at least two columns of the at least one sensitive data field by providing names of the at least two columns identified as sensitive, primary key columns and additional columns as input wherein the pre-defined condition includes a condition wherein the at least two columns occur with a similar name; and
an output generation module configured to provide the test data requested, wherein the test data is reserved for a pre-determined duration by the user using a data reservation module, wherein the output generation module archives the test data using a data archival module, wherein the test data is available for reuse in response to a user request.

2. The system of claim 1, wherein the processing engine further comprises a tool connection module configured to enable a connection for at least one external tool, wherein the at least one external tool performs at least one operation during the at least one stage associated with the lifecycle of the test data to generate the test data requested.

3. The system of claim 1, wherein the at least one stage associated with the lifecycle of the test data further comprises at least one of: creation, sub-setting, masking, storage, and data archival.

4. The system of claim 1, wherein the at least one parameter affecting the retrieval of said test data further comprises at least one of: a lifecycle time of the test data, a storage space requirement, and a privacy breach.

5. The system of claim 1, wherein the geographical location and the enterprise domain are selected by the user to regulate use of the test data in a test environment.

6. The system of claim 1, wherein the meta-data analyzer further comprises a reporting module configured to generate at least one report plotting a result of the meta-data analyzer.

7. A method to provide management of test data, the management performed during at least one stage associated with a lifecycle of said test data, the method comprising steps of:
raising at least one test data request to retrieve the test data required by a tester for testing a new application;
processing said at least one test data request to generate the test data as required, wherein the test data is retrieved based on at least one parameter affecting the retrieval, the processing further comprising steps of:
categorizing the at least one test data request while supplying the test data, wherein a categorization of the test data request is dependent on a type of usage of the test data;
modeling at least one privacy regulation in accordance with a geographical location and an enterprise domain selected by a user, wherein an imported meta-data is analyzed for:
identifying at least one sensitive data field therein wherein analysis of the imported meta-data is performed by matching names of columns with pre-defined set of patterns and user defined patterns; and
establishing a referential integrity depending upon a pre-defined condition between at least two columns of the at least one sensitive data field by providing names of the at least two columns identified as sensitive, primary key columns and additional columns as input wherein the pre-defined condition includes a condition wherein the at least two columns occur with a similar name; and
generating as an output the test data requested, wherein the test data is reserved for a pre-determined duration by the user, wherein the output generated is archived, and wherein the test data is available for reuse in response to a user request, wherein the steps of raising the at least one test data request, processing said test data request, categorizing the test data request, modeling the at least one privacy regulation, and generating as an output the test data requested are performed by a processor.

8. The method of claim 7, wherein analyzing the imported meta-data further comprises the step of generating reports and plotting a result of the analysis.

9. The method of claim 7, wherein processing said at least one test data request further comprises enabling connection for using at least one external tool, the at least one external tool performing at least one operation during at least one stage associated with the lifecycle of test data to generate the test data requested.

10. The method of claim 7, wherein the at least one stage associated with the lifecycle of the test data further comprises at least one of: creation, sub-setting, masking, storage, and data archival.

11. The method of claim 7, wherein the at least one parameter affecting the retrieval of said test data further comprises at least one of: lifecycle time of the test data, storage space requirement, and privacy breach.

12. The method of claim 7, wherein the geographical location and the enterprise domain are selected by the user to regulate use of the test data in a test environment.

13. A non-transitory computer program product having embodied thereon a computer program to provide management of test data, the management performed during at least one stage associated with a lifecycle of said test data, the computer program product comprising:
a program code for raising at least one test data request to retrieve the test data required by a tester for testing a new application;
a program code for processing said at least one test data request to generate the test data as required, wherein the test data is retrieved based on at least one parameter affecting the retrieval, the processing further comprising steps of:
a program code for categorizing the at least one test data request while supplying the test data, wherein a categorization of the test data request is dependent on a type of usage of the test data;
a program code for modeling at least one privacy regulation in accordance with a geographical location and an enterprise domain selected by a user, wherein an imported meta-data is analyzed for:
identifying at least one sensitive data field therein wherein analysis of the imported meta-data is performed by matching names of columns with pre-defined set of patterns and user defined patterns; and
establishing a referential integrity depending upon a pre-defined condition between at least two columns of the at least one sensitive data field by providing names of the at least two columns identified as sensitive, primary key columns and additional columns as input wherein the pre-defined condition includes a condition wherein the at least two columns occur with a similar name; and
a program code for generating as an output the test data requested, wherein the test data is reserved for a pre-determined duration by the user, wherein the output generated is archived, and wherein the test data is reused with respect to the user's request.

14. The computer program product of claim 13, further comprising program code for generating reports and plotting a result of the analysis of the imported meta-data.

15. The computer program product of claim 13, wherein the program code for processing said at least one test data request further comprises program code for enabling connection for using at least one external tool, the at least one external tool performing at least one operation during at least one stage associated with the lifecycle of test data to generate the test data requested.

* * * * *